United States Patent [19]

Richter et al.

[11] 4,094,511
[45] June 13, 1978

[54] BELT-DRIVEN RECORD PLAYER

[75] Inventors: Erhard Richter; Dietrich Borsum, both of Kiel, Germany

[73] Assignee: Electroacustic GmbH, Kiel, Germany

[21] Appl. No.: 661,336

[22] Filed: Feb. 25, 1976

[30] Foreign Application Priority Data

Mar. 21, 1975 Germany .............................. 2512403

[51] Int. Cl.² ........................... G11B 3/60; F16H 7/10
[52] U.S. Cl. ............................ 274/39 A; 74/242.15 R
[58] Field of Search ...... 274/39 A; 74/209, 242.15 R, 74/242.11 P

[56] References Cited

U.S. PATENT DOCUMENTS

| 3,393,915 | 7/1968 | Osborne et al. | 274/39 A |
| 3,885,798 | 5/1975 | Yokokura | 274/39 A |

FOREIGN PATENT DOCUMENTS 2,218,040  10/1973  Germany .......................... 274/39 A Primary Examiner—Steven L. Stephan
Attorney, Agent, or Firm—Michael J. Striker

[57] ABSTRACT

The record player has a turntable formed with an outer rim. A belt-pulley is mounted on the shaft of the turntable; another belt pulley is mounted on a pulley shaft parallel to but spaced from the turntable shaft. A belt connects the two pulleys. On this pulley shaft, a friction wheel is also mounted. The pulley shaft is mounted for movement in a plane normal to its elongation. A spring maintains the friction wheel in engagement with a motor output shaft via which the pulley shaft is driven. Normally, torque is indirectly transmitted to the turntable via the belt. However, all times when increased torque is temporarily required, the pulley shaft moves so that the friction wheel — which remaining in contact with the motor output shaft — engages the rim of the turntable to transmit additional torque directly to the same.

6 Claims, 2 Drawing Figures

BELT-DRIVEN RECORD PLAYER

BACKGROUND OF THE INVENTION

This invention relates to a record player of the manual or automatic type, and more particularly to a belt-driven record player.

At certain times during operation, record players have a requirement for transmission of higher torque to the turntable than at other times. In the case of automatic record changes this occurs, for example, when the record spindle is operated to allow the bottom record of a stack of records to descend onto the turntable. If the record player is of the type having a belt drive, it frequently happens that slipping occurs between the belt and the belt pulleys at such times of increased torque requirements. This leads to distortion of the played-back sound.

Proposals have been made in the art for overcoming the problem, but none have been fully satisfactory.

SUMMARY OF THE INVENTION

It is, therefore, an object of the invention to provide an improved arrangement which avoids the aforementioned disadvantages.

More particularly, it is an object of the invention to provide an improved record player which is not possessed of these disadvantages.

A further object is to provide a record player wherein increased torque is automatically furnished as a function of demand and only for the duration of the demand.

An additional object of the invention is to provide such a record player which is of relatively simple construction and reliable in operation.

In pursuance of the above objects, and of others which will become apparent hereafter, one feature of the invention resides in a belt-driven record player which, briefly stated, comprises a turntable rotatable about an axis; drive means for rotating said turntable about the axis by transmitting torque indirectly to the turn-table; and auxiliary means for intermittently transmitting additional torque directly to said turntable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
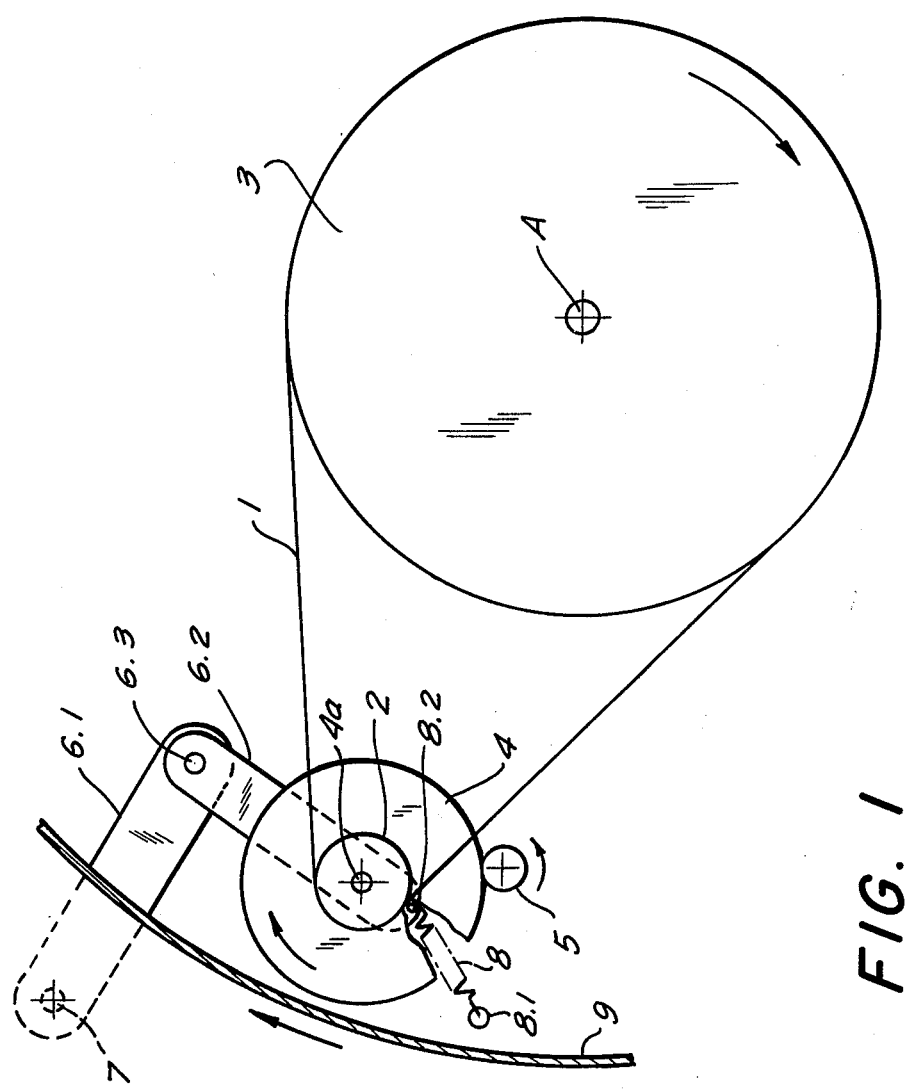
FIG. 1 is a fragmentary bottom plan view, partly in section, of a record player embodying the invention, shown in normal playing position.
Figure 2:
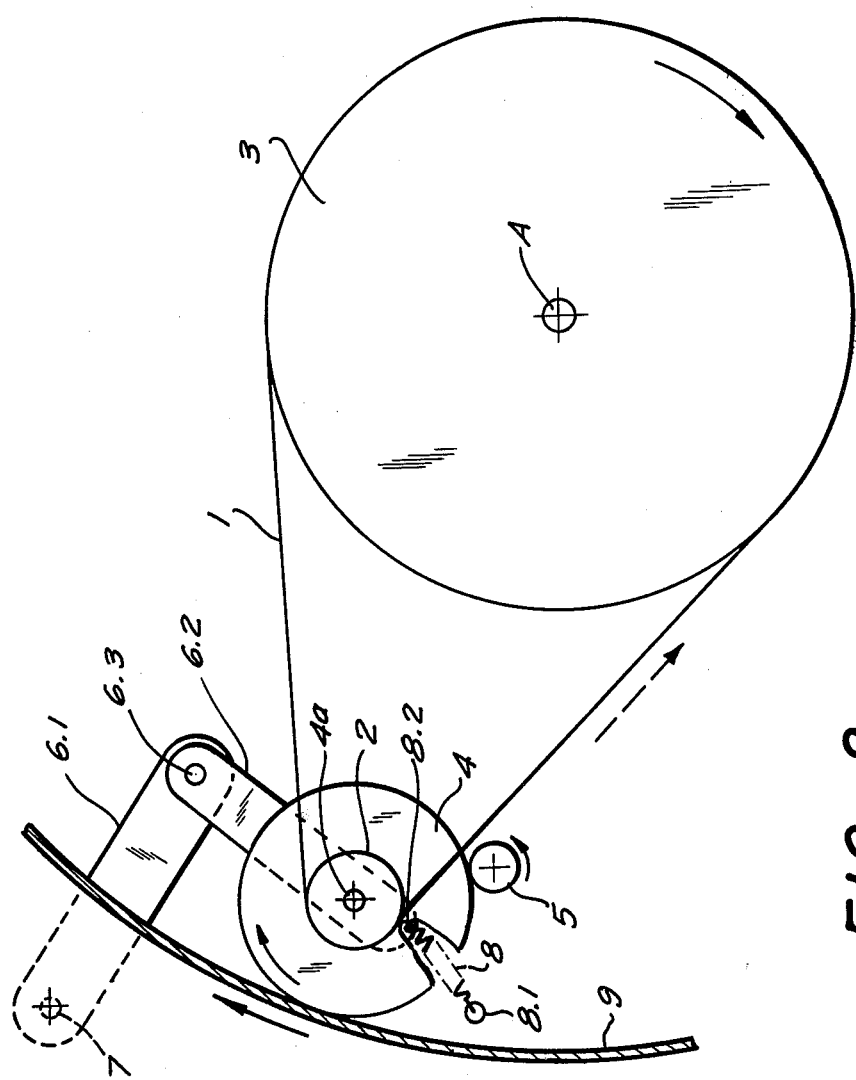
FIG. 2 is a view similar to FIG. 1, but showing the same record player at a time of increased torque requirements.

FIGS. 1 and 2 of the drawing show one and the same record player. Only those parts of the player are illustrated which are essential to an understanding of the invention. The parts not shown should be understood to be those that are found in conventional belt-driven record players and which therefore require no explanation.

With this in mind, it will be seen that FIGS. 1 and 2 show a belt-pulley 3 mounted at the underside of a record-supporting turntable of which only a portion 9 of the outer circumferential annular rim is illustrated. This turntable rotates about an axis A of a shaft on which the pulley 3 is fixedly mounted.

Also provided is a pulley shaft 4a on which there are mounted for joint rotation a further belt-pulley 2, as well as a friction wheel 4. A drive motor (not shown) has an output shaft 5 which is laterally spaced from the shaft 4a and extends parallel thereto. The friction wheel 4 has its periphery in engagement with the shaft 5 so that, as the latter turns, the wheel 4 is frictionally entrained in rotation. Since wheel 4 is fixed to shaft 4a, this results in rotation of that shaft and of the pulley 2 which is also fixed to the same. This rotation of pulley 2 is transmitted via a drive belt 1 to the pulley 3 and hence to the turntable.

In ordinary operation, i.e., in the normal playing mode of the record player, the torque thus transmitted to the turntable is sufficient. However, when the torque-demand increases temporarily for the earlier-mentioned reasons, slippage is likely to occur between the belt and the pulleys.

This problem is overcome by the present invention.

The novel player in FIGS. 1 and 2 will be seen to include a toggle lever having an arm 6.1 that is pivoted to a stationary part (e.g. the frame) of the player at 7, and an arm 6.2 that mounts the pulley shaft 4a which is not otherwise connected with the player. The proximal ends of arms 6.1 and 6.2 are pivotally connected at 6.3. The location of the pivot 7 (usually below the chassis plate of the record player) must be so selected that the arms 6.1 and 6.2 do not between themselves include either too acute or too obtuse an angle. An included angle on the order of 90° has been found to be most advantageous.

A tensioned spring 8 has its opposite ends connected at 8.1 to a stationary part of the player and at 8.2 to the arm 6.2. The location 8.1 is so selected that the tension exerted by spring 8 performs a dual function: it permanently draws the friction wheel 4 into engagement with the motor output shaft 5, and it acts upon the toggle lever 6.1 and 6.2 in a sense tending to move the pulley 2 away from the pulley 3 and thus to tension the belt 1.

In normal playing mode (FIG. 1) the friction wheel is in engagement with the shaft 5 to be driven thereby. It is also located close to, but out of contact with, the inner circumferential surface of the turntable rim 9.

When there is an increased torque demand, the pulley 2 and the friction wheel 4 are subjected to the braking action of the belt 1. The stronger this action which occurs in form of pull exerted by the belt (see the broken arrow in FIG. 2), the more the friction wheel 4 is urged towards the rim 9. It can perform this movement and still remain in engagement with shaft 5, because of the presence of the toggle lever 6.1 and 6.2 and the fact that the shaft 4a is carried by the arm 6.2 of this lever and can thus move in a plane normal to the elongation of axis A, i.e., parallel to the plane of the turntable.

This movement of friction wheel 4 towards the rim 9 tensions the belt 1 further so that increased torque is transmitted to the pulley 3. If the torque demand is still greater so that even this increased torque does not suffice, the wheel 4 will finally move into frictional engagement with the inner surface of rim 9 (FIG. 2) while still remaining in contact with the motor shaft 5 due to the urging of spring 8, so that it now transmits torque directly to the turntable. This torque transmission is in parallel to the continued indirect transmission of torque via the belt 1 and the pulley 3.

It would be conceivable to train the belt 1 about the periphery of the turntable, instead of using the pulley 3. However, for technical reasons and for aesthetic reasons it is usually preferred to have the belt located below the turntable and to use the pulley which is of a smaller diameter than the turntable. In such a construction it is advisable, in the interest of uniform stress distribution, to make the relative diameter ratio of the pulleys 2 and 3 equal to the relative diameter ratio of the friction wheel 4 to that of the inner surface of the turntable rim 9.

One important aspect of the invention is that the dual, parallel torque transmission to the turntable is only temporary. It might appear, at first sight, that it would be simpler to so construct the player that the higher torque is transmitted to the turntable all of the time. However, that would re-introduce a factor which the use of a belt-drive is intended to remove, namely the rumbling noise that is heard during playing of a record if the motor vibrations are allowed to be transmitted to the turntable via the drive. Such transmission is best prevented by the use of a drive belt to transmit torque to the turntable, but during direct torque transmission from wheel 4 to rim 9 this "isolating" feature is, of course negated. Therefore, the arrangement according to the invention is such that the direct torque transmssion can take place only as long as absolutely necessary. As a rule, the periods during which the increased torque is required are at times when no record is actually being played, e.g. during record changing, tone-arm pivoting between operative and inoperative positions, and switching-off of the player at the end of the changing cycle. Thus, the rumble that is temporarily audible does not interfere with the listening pleasure of a user.

It will be understood that each of the elements described above, or two or more together, may also find a useful application in other types of applications, differing from the types described above.

While the invention has been illustrated and described as embodied in a belt-driven record player, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A belt-driven record player, comprising a turntable having a circumferential rim and being rotatable about an axis, said turntable being in normal operation subjected to a first load but being intermittently subjected to a higher second load; means for driving said turntable, including a motor shaft, a pulley shaft parallel to said motor shaft and mounting a drive pulley, a friction wheel on said pulley shaft rotatable therewith, and a drive belt trained about said pulley and transmitting torque to said turntable; and means responsive to changes in the load acting upon said turntable and mounting said pulley shaft for displacement in parallelism with said axis between a first position which it assumes when said first load acts upon said turntable and in which said friction wheel functionally engages said motor shaft but is spaced from said rim so that torque is transmitted to said turntable only via said drive belt, and a second position which said pulley shaft assumes when said second load acts upon said turntable and in which said friction wheel frictionally engages both said motor shaft and said rim so that torque is transmitted to said turntable via said drive belt as well as directly via said friction wheel to said rim.

2. A record player as defined in claim 1; further comprising spring means acting upon said pulley shaft in a sense maintaining said belt taut and said friction wheel in engagement with said motor shaft.

3. A record player as defined in claim 1; further comprising a driven pulley on said axis of said turntable, said belt also being trained about said driven pulley.

4. A record player as defined in claim 3, wherein said driven pulley has a diameter smaller than said turntable.

5. A record player as defined in claim 4, wherein the diameter ratio of said drive pulley to said driven pulley equals the diameter ratio of said friction wheel to the inner diameter of said rim.

6. A belt-driven record player, comprising a turntable having a circumferential rim and being rotatable about an axis, said turntable being in normal operation subjected to a first load but being intermittently subjected to a higher second load; means for driving said turntable, including a motor shaft, a pulley shaft parallel to said motor shaft and mounting a drive pulley, a friction wheel on said pulley shaft rotatable therewith, and a drive belt trained about said pulley and transmitting torque to said turntable; and means responsive to changes in the load acting upon said turntable and mounting said pulley shaft for displacement relative to said axis between a first position which it assumes when said first load acts upon said turntable and in which said friction wheel frictionally engages said motor shaft and a first torque is transmitted to said turntable via said drive belt, a second position which said pulley shaft assumes when said second load acts upon said turntable and in which said pulley shaft tensions said drive belt and said friction wheel continues to engage said motor shaft so that a higher second torque is transmitted to said turntable via said drive belt, and a third position in which said pulley shaft tensions said drive belt further and said friction wheel continues to engage said motor shaft and also engages said rim of said turntable so that a still higher third torque is transmitted to said turntable.

* * * * *